United States Patent [19]

Klein

[11] Patent Number: 4,494,678

[45] Date of Patent: Jan. 22, 1985

[54] APPARATUS FOR COMPENSATING A PRESSURIZED VESSEL ON A SCALE

[75] Inventor: Karl-Heinz Klein, Gelnhausen-Hailer, Fed. Rep. of Germany

[73] Assignee: K-Tron Soder A.G., Niederlenz, Switzerland

[21] Appl. No.: 351,377

[22] Filed: Feb. 23, 1982

[30] Foreign Application Priority Data

Feb. 23, 1981 [CH] Switzerland .......................... 1174/81

[51] Int. Cl.³ .......................................... G01G 13/00
[52] U.S. Cl. ...................... 222/77; 177/116; 177/145; 222/145; 222/630
[58] Field of Search .................. 222/77, 152, 129, 145, 222/196, 410, 413, 195, 411, 198, 200, 630, 637; 414/217, 218, 221, 21; 177/111, 116, 184, 145; 406/23–25, 31–33, 146

[56] References Cited

U.S. PATENT DOCUMENTS

| | | |
|---|---|---|
| 2,891,782 | 6/1959 | Blackman et al. .............. 222/145 X |
| 3,093,271 | 6/1963 | Douglas ........................ 222/413 |
| 3,353,720 | 11/1967 | Ricciardi ...................... 222/200 |
| 3,807,602 | 4/1974 | Meichsner ..................... 222/77 X |
| 4,005,908 | 2/1977 | Freeman ........................ 406/25 |
| 4,071,166 | 1/1978 | Legille et al. ................... 222/1 |
| 4,083,475 | 4/1978 | Venner et al. .................. 222/198 |
| 4,182,383 | 1/1980 | Admotis et al. ............. 222/195 X |

*Primary Examiner*—Joseph J. Rolla
*Assistant Examiner*—Kevin P. Shaver
*Attorney, Agent, or Firm*—Parkhurst & Oliff

[57] ABSTRACT

A system is disclosed which allows a container and material to be weighed in the presence of a pressurized gas and reduces the effects on that weighing caused by variations in the gas flow and pressure. The system includes a container which receives material to be weighed and a structure for discharging material from the system. The container is mounted on a scale for providing weight readings and flexibly coupled by at least one inlet to provide a pressurized gas to the container which isolates gas flow and pressure effects transmitted to the container.

9 Claims, 2 Drawing Figures

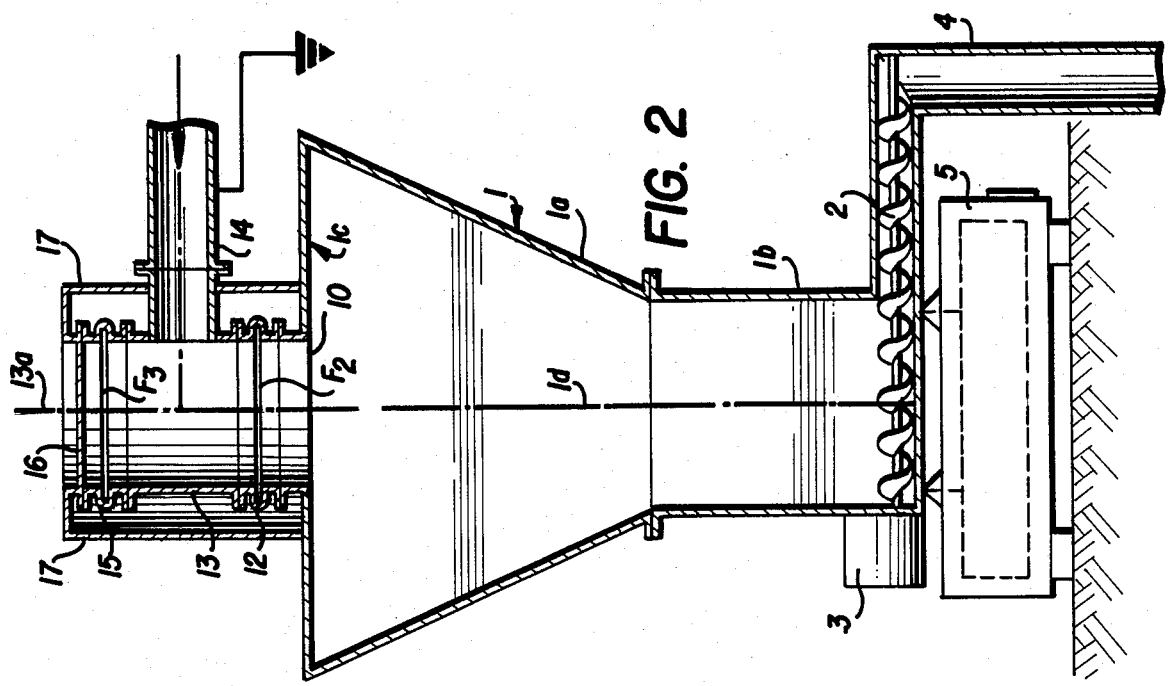
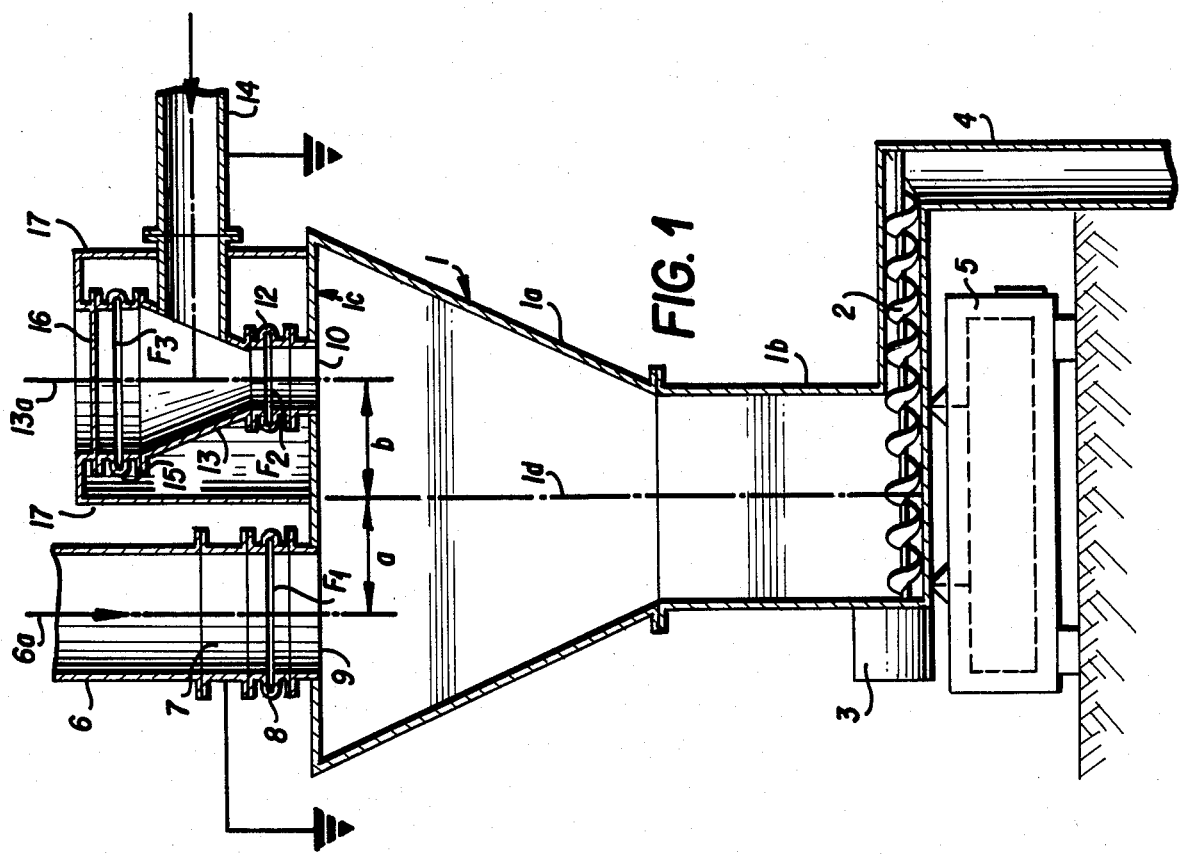

APPARATUS FOR COMPENSATING A PRESSURIZED VESSEL ON A SCALE

BACKGROUND

The present invention relates to a substantially closed, pressurized vessel for mounting on a scale. The vessel has a gas inlet which admits compressed gas to supply a gas blanket over the material contained in the vessel. With vessels of this type, it is also desired to connect the gas inlet to the vessel wall, through flexible means, so that a rigid connection between the gas inlet and the gas line will be possible. This leads to problems when the container has a discharge apparatus, such as a screw feeder, because the pressure of the gas blanket creates forces which influence the weighing and, in the case of computerized weighing systems, it will distort the results and also the feedback signal supplied by the computerized system. This is the case when, as is common today, the gas inlet is connected to the vessel by a freely movable sleeve which will not transmit any forces between the gas line and the gas inlet even when they are moving relative to each other.

SUMMARY OF THE INVENTION

In order to avoid disturbing influences, the gas inlet in accordance with the present invention provides a vertical pipe section to which the gas line is rigidly mounted through the side and where both ends of the vertical pipe section are connected to the vessel by means of flexible sleeves so that no forces are transmitted to the vessel. The lower end of the vertical pipe is connected to the vessel cover and the upper end of the vertical pipe is connected to an end plate, which is also connected to the container cover through a rigidly mounted enclosure. By selecting the proper area for the lower and upper sleeve connection, and taking into account the material feed inlet, which is also connected to the vessel by means of a flexible sleeve, a complete pressure compensation can be obtained so that pressure variation in the compressed gas line will have no influence on the weighing operation.

DESCRIPTION OF THE DRAWINGS

For the purpose of illustrating the invention, there is shown in the drawings, forms which are presently preferred; it being understood, however, that this invention is not limited to the precise arrangements and instrumentalities shown.

There is shown in the drawings a vessel in accordance with the present invention mounted on a scale in which:

FIG. 1 is a cross-sectional view of a first embodiment showing a vessel having a material supply line and a gas supply line; and FIG. 2 is a cross sectional view of a second embodiment showing a vessel having only a gas supply line.

DETAILED DESCRIPTION OF THE INVENTION

Referring now to FIG. 1, the container, generally indicated by the numeral 1, has an upper funnel-shaped section 1a and a lower section 1b to which a screw feeder 2 is connected at the bottom. Screw feeder 2 is driven by any well-known drive means 3. Screw feeder 2 conveys the contents of container 1 into a discharge tube 4. Container 1 is mounted on a scale 5, which may be of any well-known type, and which may in turn be connected to computerized automatic control apparatus.

A stationary material supply line 6 is used to fill the container 1. The material flow can be adjusted by a gate valve 7, whose discharge opening is connected dust tight to the material inlet opening 9 of container 1 by means of flexible sleeve 8. Flexible sleeve 8 consists of a pliable material soft enough so that it will not transmit any forces even when container 1 moves relative to supply line 6.

The cover 1c of container 1 has an additional opening 10 for gas supply. Opening 10 is connected to the lower end of a funnel-shaped vertical pipe 13 by means of a flexible sleeve 12. A gas supply line 14 is rigidly connected to pipe 13 through the side thereof. The upper end of vertical pipe 13 is closed off airtight by an end plate 16 connected to vertical pipe 13 by means of a flexible sleeve 15. End plate 16 is rigidly mounted to an enclosure 17, which is in turn rigidly mounted to cover 1c.

The cross-sectional area F1 of flexible sleeve 8 for the material supply line, the cross-sectional area F2 of flexible sleeve 12 for the vertical pipe 13 on the container side and the cross-sectional area F3 for the vertical pipe 13 on the end plate side are so proportioned that cross-sectional area F3 is equal to the sum of cross-sectional areas F1 and F2.

Center line 6a of material supply line 6, center line 13a of the vertical pipe 13 and the vertical line 1d through the center of gravity of the apparatus are all in the same plane, and the distance between the center line 6a and the center line 1d is the same as the distance between the center line 1d and the center line 13a.

In the event a container is not equipped with a material supply line 6, as seen in the embodiment in FIG. 2, then cross-sectional area F2 is equal to cross-sectional area F3, and vertical pipe 13 must be arranged so that center line 13a and the vertical line 1d through the center of gravity of the apparatus are the same.

With the arrangement described above, neither variations of the pressure in the gas line nor the flow of gas into the container will affect the scale and disturb the measurements.

The present invention may be embodied in other specific forms without departing from the spirit or essential attributes thereof and, accordingly, reference should be made to the appended claims, rather than to the foregoing specification, as indicating the scope of the invention.

I claim:

1. A weighing system comprising:
   a scale;
   a container for receiving material coupled to said scale such that said scale provides weight measurements of said container and any material therein;
   a first inlet coupled to said container for providing material to said container and having a first cross-sectional area;
   a second inlet coupled to provide pressurized gas to said container and including a first portion having a second cross-sectional area, a second portion having a third cross-sectional area, a third portion coupled to deliver a flow of gas, and means for flexibly coupling said third portion to said first and second portions, the sum of said first and second cross-sectional areas being equal to the third cross-sectional area; and means for discharging material from said container.

2. The system of claim 1 wherein said first inlet has a center line, said first and second portions have a common center line, and said container has a center line and further wherein the center line of said first inlet is spaced the same distance from the center line of said container as the common center line of said first and second portions.

3. The system of claim 2 wherein each of said center lines lie in the same plane.

4. A substantially closed container for mounting on a weighing scale comprising:
a container;
first means for flexibly coupling a material supply pipe to said container for introducing material to be weighed into the container;
outlet means for discharging material from said container;
second means for flexibly coupling a gas pipe to said container for introducing pressurized gas into the container, said second means being constructed and arranged such that effects caused by the transmission of variations in the pressure or flow of the pressurized gas to the container are reduced and thereby reduce their effect on the weight readings of a scale, said second means comprising an enclosure rigidly coupled to the container, an inlet pipe extending through a side of said enclosure and rigidly coupled to the gas pipe, an end plate coupled to said enclosure, said inlet pipe having first and second portions wherein said first portion is coupled to said end plate by a first flexible sleeve and said second portion is coupled to said container by a second flexible sleeve.

5. A container according to claim 4, wherein the cross-sectional area of the first sleeve equals the sum of the cross-sectional area of the second sleeve plus the cross-sectional area of the first means.

6. A container according to claim 4, wherein the center line of the inlet pipe, the center line of the material supply pipe and the center line of the container are all in the same plane.

7. A container according to claim 6, wherein the distance between the center line of the inlet pipe and the center line of the container is the same as the distance between the center line of the container and the center line of the material supply pipe.

8. A substantially closed container for mounting on a weighing scale comprising:
a container for receiving material;
outlet means for discharging material from said container; and
means for flexibly coupling a gas pipe to said container for introducing pressurized gas into the container, said means for flexibly coupling being constructed and arranged such that effects caused by the transmission of variations in the pressure or flow of the pressurized gas to the container are reduced and thereby reduce their effect on the weight readings of a scale, said means for flexibly coupling comprising an enclosure rigidly coupled to the container, an inlet pipe extending through a side of said enclosure and rigidly coupled to the gas pipe, an end plate coupled to said enclosure, said inlet pipe having first and second portions wherein said first portion is coupled to said end plate by a first flexible sleeve and said second portion is coupled to said container by a second flexible sleeve.

9. The system of claim 8 wherein said container has a center line through its center of gravity and said first and second portions define a center line of said inlet pipe, said first and second portions being positioned such that the center line defined by said first and second portions of said inlet pipe is the same as the center line of said container.

* * * * *